W. O. RAWLS.
COMBINED CABINET AND RACK.
APPLICATION FILED JAN. 21, 1921.

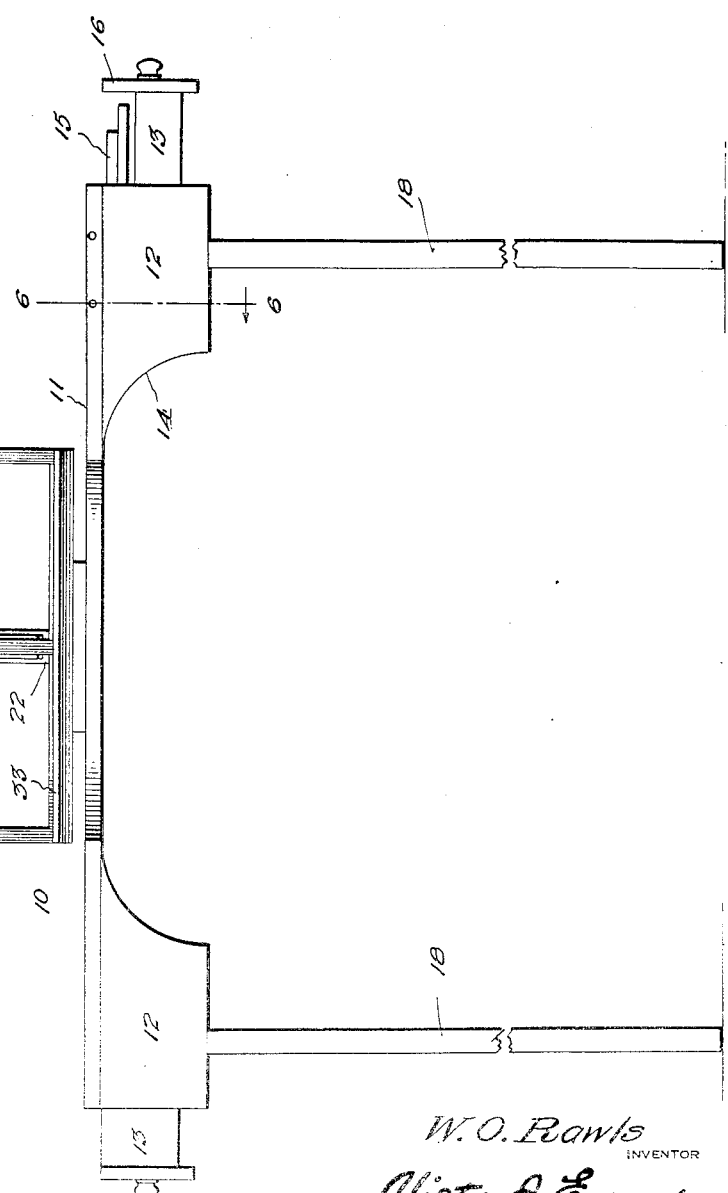

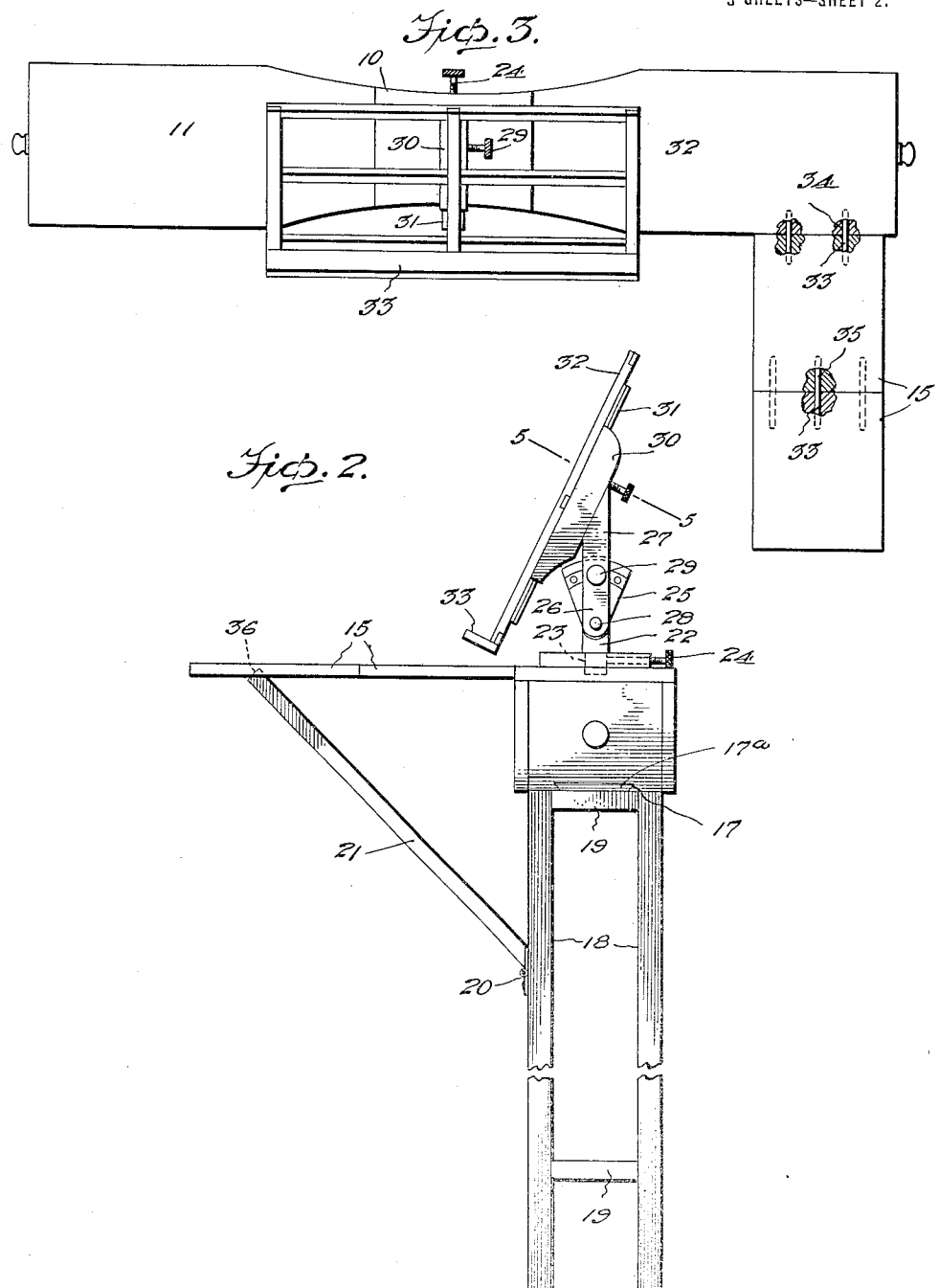

1,409,026.

Patented Mar. 7, 1922.
3 SHEETS—SHEET 3.

W. O. Rawls
INVENTOR

BY Victor J. Evans
ATTORNEY

UNITED STATES PATENT OFFICE.

WALTER O. RAWLS, OF FORT SILL, OKLAHOMA.

COMBINED CABINET AND RACK.

1,409,026.  Specification of Letters Patent.  Patented Mar. 7, 1922.

Application filed January 21, 1921. Serial No. 438,917.

*To all whom it may concern:*

Be it known that I, WALTER OWEN RAWLS, a citizen of the United States, residing at Fort Sill, in the county of Commanche and State of Oklahoma, have invented new and useful Improvements in Combined Cabinets and Racks, of which the following is a specification.

This invention relates to a combined desk, table and reading stand and has for an object the provision of a device which combines all of the above features and which may be either supported upon detachable legs, or supported upon the arms of a Morris chair or the like.

Another object of the invention is the provision of a device of this character in which the rack which supports the reading matter may be adjusted, vertically, pivotally and rotatably so as to properly position the reading matter with respect to the eyes of the individual user and for the purpose of obtaining the most advantageous light.

Another object of the invention is the provision of a reading stand in which are housed detachable leaves which may be removably secured to the base of the stand so as to provide a table, making the device convenient for both reading and writing and being especially desirable for study in that the reference book may be secured to the rack while the table affords a convenient means for making notes.

With the above and other objects in view, the invention further includes the following novel features and details of construction, to be hereinafter more fully described, illustrated in the accompanying drawings and pointed out in the appended claims.

In the drawings:—

Figure 1 is a front elevation of the device with the supporting legs in position and the table leaves removed.

Figure 2 is an end view of the same.

Figure 3 is a top plan view showing the table leaves in position.

Figure 7 is a detail perspective view of the detachable leg member.

Figure 4:
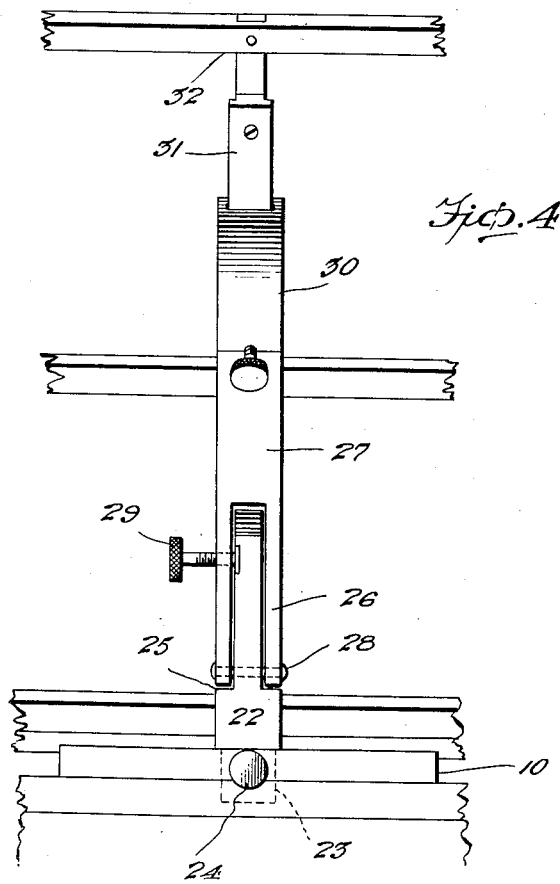
Figure 4 is an enlarged rear elevation showing the manner of supporting the rack upon the base.
Figure 5:
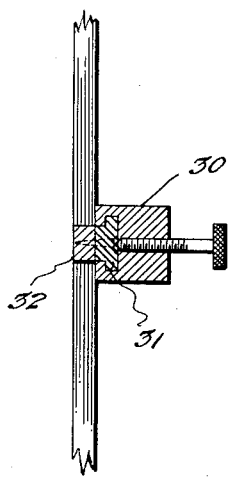
Figure 5 is a sectional view on the line 5—5 of Figure 2.
Figure 6:
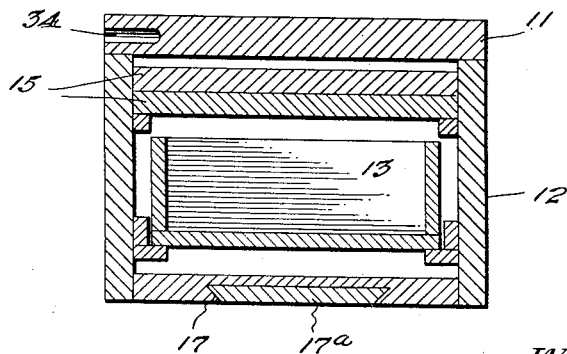
Figure 6 is a sectional view on the line 6—6 of Figure 1.

Referring to the drawings in detail, wherein like characters of reference denote corresponding parts, the invention includes a base which is designated generally at 10 and comprises a table member 11, beneath each end of which is provided a compartment 12, having slidably mounted therein a drawer 13. The front and rear walls of the compartments 12 are cut away as shown at 14 so as to provide space for the knees of the user. The compartments 12 also act to elevate the table member 11 when the device is supported upon the arms of a chair.

The drawers 13 are slidable within the compartments 12, but the upper portions of one or both of these compartments is adapted to contain leaves 15, the faces 16 of the drawer being of a sufficient size to include these leaves. In other words, the drawer 13 occupies only a portion of the compartment 12, while the base 16 of the said drawer entirely closes the end of the compartment in which the leaves 15 are housed. In the present instance the leaves are shown in only one of the compartments, the drawer 13 occupying substantially the entire area of the other compartment.

For the purpose of supporting the table or desk, there is provided detachable legs, the latter being capable of attachment to each end of the said table and for this purpose the lower wall or bottom of each compartment 12 is provided with a horizontally arranged groove 17, which is adapted to receive a head 17$^a$. Secured to this head is a pair of legs 18, which are connected at their upper and lower ends by means of transverse bars 19, the upper bar serving as a means for securing the legs to the head 17$^a$. The legs may thus be attached to or removed from the bottom of each of the compartments as desired so that the device may either be supported upon its own legs, or rested upon the arms of a chair or other support. In addition, each of the leg sections has hingedly connected thereto as shown at 20, a brace bar 21, the purpose of which will be later explained.

Rotatably mounted in the top of the base 10 is a sectional standard 22, the lower section of which is reduced as shown at 23 so that a shoulder is provided which rests upon the upper surface of the base. This standard may be held against rotation within the base by a set screw 24. The upper end of the lower section of the standard 22 is also reduced at 25 and this portion 25 is adapted to be received within the bifurcated end 26 of the upper section 27 of the standard, the upper and lower sections of the said standard being pivotally connected as shown at 28. They may be held against relative pivotal movement by means of a set screw 29.

The upper end of the section 27 of the standard carries a grooved guide 30 which is preferably inclined and movable within the groove of this guide is a substantially T-shaped slide 31 which is secured to the base of a rack 32. This rack is designed to support a hook or other article and for this purpose is provided along its lower edge with a supporting ledge 33. By mounting the rack 32 in the manner just described, the latter may be vertically adjusted within the grooved guide 30, while the section 27 of the standard which carries this guide may be adjusted upon the pivot 28 so as to move the rack laterally toward and away from the user. In addition, the rack may be rotatably adjusted upon the reduced portion 23 of the standard 22 so as to bring the book or other article supported upon the rack into the most advantageous position to receive the light.

The leaves 15 which are housed within one of the compartments 12 are designed to be secured to the table member 11 for the purpose of providing a table or desk for use in connection with the rack. For this purpose, each of the leaves is provided at one end with projecting pins 33, the pins 33 of one leaf being adapted to enter sockets 34 provided in the table member 11, while the pins 33 of the other leaf are designed to enter sockets 35 formed in the opposite end of the first mentioned leaf. The leaves may thus be detachably secured to the base as shown in the drawings and when in such position will provide a convenient writing desk or table which may be advantageously used in connection with the rack. In order to provide a support for the leaves 15 when the latter are secured in position for use, the brace 21 is raised so that its free end engages the under side of the outermost leaf, a socket or depression 36 being provided for engagement therewith.

The invention is susceptible of various changes in its form, proportions and minor details of construction and the right is herein reserved to make such changes as properly fall within the scope of the appended claims.

Having described the invention what is claimed is:—

1. A device of the class described comprising a base, a rack supported thereon, said base being of elongated shape and having a drawer at each end thereof, leaves removably positioned in the base above the drawer and means whereby said leaves may be detachably secured to the base to provide a substantially L-shaped table.

2. A device of the class described comprising a base, a rack supported thereon, said base being of elongated shape and having a drawer at each end thereof, leaves removably positioned in the base above the drawer and means including pin and socket connection between the ends of the leaves and base, whereby the former may be detachably secured to the latter to provide a substantially L-shaped table.

In testimony whereof I affix my signature.

WALTER O. RAWLS.